Nov. 22, 1960  T. ZIAYLEK, JR  2,961,247
SPINDLE ASSEMBLY
Filed Feb. 24, 1959
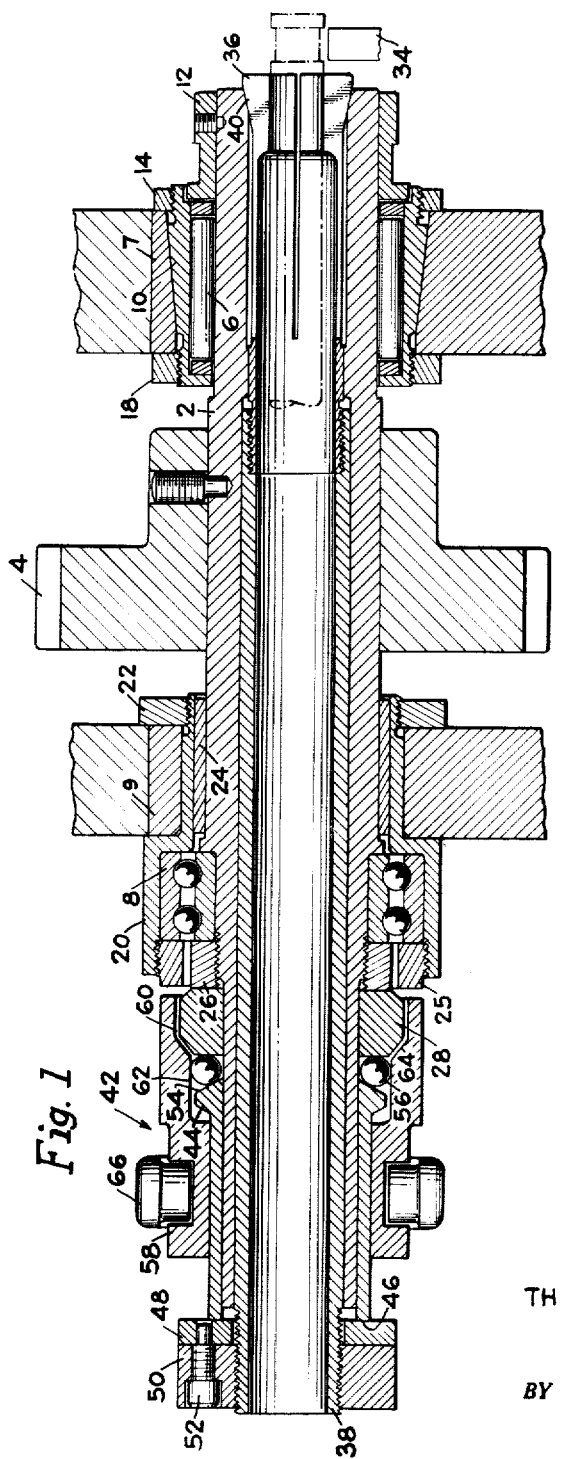
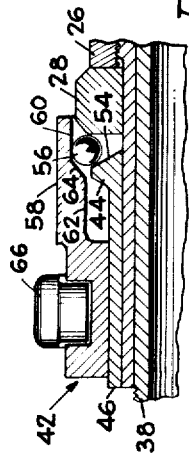
THEODORE ZIAYLEK, JR.
INVENTOR.
BY Albert Sperry
ATTORNEY

United States Patent Office 2,961,247
Patented Nov. 22, 1960

2,961,247

SPINDLE ASSEMBLY

Theodore Ziaylek, Jr., 140 Riverview Ave., Yardley, Pa.

Filed Feb. 24, 1959, Ser. No. 795,053

3 Claims. (Cl. 279—1)

This invention relates to spindle mounting and chucking assemblies for automatic screw machines and is directed particularly to improvements which permit increased speed of operation and simplify repair or replacement of parts.

Automatic screw machines are widely used in the manufacture of small pieces or machined parts and may embody either one or a number of work supporting spindles. It is generaly desirable to operate such machines at the highest possible speed in order to obtain the maximum output. However, the vibration and deflection of the spindle is greatly increased as its speed of rotation is increased with the result that the accuracy of the machining operation is decreased and the wear on the bushings or bearings by which the spindle is supported is much greater. It is, therefore, necessary to replace the bushings frequently with resulting loss of production time. Moreover, high speed operation often causes failure or breakage of the elements which actuate the collet or chucking members increasing the frequency of repair.

It is also necessary in certain types of screw machines to remove the tool spindle and its bearings in order to withdraw the work spindle from the assembly. This not only prolongs the operation but also makes it necessary to reset the tools each time the bearings for the work spindle are replaced.

In accordance with the present invention, these objections and limitations of prior screw machines are overcome and novel constructions are provided which permit increased speed of operation while assuring accuracy in the machining of parts and reduce the time and cost involved in making replacements or repairs.

These advantages are preferably attained by the use of a novel arrangement and type of bearing assembly and by providing improved means for actuating the work holding collet. In the preferred form of the invention shown in the drawing, the construction is designed for use on a "Davenport" screw machine. The usual bronze bushing is replaced by a roller bearing and the bearings are arranged to reduce deflection of the spindle to a minimum. Furthermore, the elements are constructed to permit removal of the spindle toward the rear of the machine instead of toward the tool spindle. The device further includes novel chucking means for actuating the collet whereby the danger of breakage or improper operation at high speed is reduced.

Accordingly, the principal objects of the present invention are to permit increased speed of operation and assure greater accuracy in the machining of parts in an automatic screw machine and to simplify the operations involved in the replacement of the work spindle bearings.

Another object of the invention is to provide improved means for actuating the collet of an automatic screw machine.

A specific object of the invention is to provide a novel and improved form of work spindle assembly adapted to be applied as a replacement for the existing spindle assembly of a Davenport automatic screw machine to permit increased speed of operation and decrease the time and cost involved in replacement of bearings therein.

These and other objects and features of the invention will appear from the following description thereof wherein reference is made to the figure of the accompanying drawing.

In the drawing:

Fig. 1 is a longitudinal sectional view through a typical form of work holding spindle embodying the present invention.

Fig. 2 shows a detail of the construction illustrated in Fig. 1 with the parts in a work releasing position.

In that form of the invention chosen for purposes of illustration in the drawing, the assembly embodies a work holding spindle 2 driven by a gear 4 is positioned between the front bearing 6 carried by a spindle mounting or turret member 7, and rear bearing 8 carried by a spindle mounting or turret member 9. The front bearing includes a roller bearing assembly having an outer race member 10 located adjacent the spindle nose cap 12 and held in place by adjusting nuts 14 and 18. The rear bearing 8 for the spindle is preferably a ball bearing which is held in place by the bearing retainer 20 to which the spindle box nut 22 is secured. An oil retaining bushing 24 may be located between the bearing retainer 20 and the spindle 2. The rear side of the ball bearing is engaged by the bearing nut 25 and the spindle thrust nut 26 which is backed up by pressure ring 28.

The construction thus provided renders the assembly suitable for use as a replacement for the spindle assembly usually provided in Davenport screw machines and serves to provide the spindle with roller and ball bearings thereby permitting higher speeds of rotation with less wear. The adjustments and accuracy in placement of the bearings also serve to assure greater accuracy in the machining operations. Furthermore, the present invention permits the spacing and positioning of the bearings so as to reduce deflection of the spindle under load. Thus, the roller bearing 6 is located adjacent the front end of the spindle in position to take up the lateral thrust on the spindle and work when using a tool such as that shown at 34. On the other hand, the ball bearing 8 is positioned on the opposite side of the spindle driving gear 4 and beyond the turret member 9 whereby the rear portion of the spindle is supported in a manner to reduce vibration thereof.

The collet 36 by which the work is gripped and supported is secured to a collet tube 38 movable longitudinally within the spindle 2. The outer end of the collet presents an outwardly inclined surface 40 which engages a correspondingly inclined camming surface on the spindle so that movement of the collet 36 and tube 38 to the left as shown in the drawing causes the fingers of the collet to be forced inward to grip a work piece extending through the tube and collet. Movement of the collet and tube to the right as shown in the drawing permits the fingers of the collet to expand and release the work.

The chucking means employed for actuating the collet is shown generally at 42 in the drawing and includes a chucking member 44 which surrounds the spindle 2 and has an outer end 46 positioned to engage a collet tube adjusting plate 48 secured to the collet tube by the nut 50 and lock screw 52.

The inner end of the chucking member 44 presents an inclined surface 54 engaged by a plurality of balls 56. These balls are held in place between the surface 54 and the pressure ring 28 by means of a chucking sleeve 58. The inner surface of the chucking sleeve has a portion 60 of relatively larger diameter and a portion 62 of smaller diameter with an intermediate sloping portion 64 that is inclined from the larger to the smaller portion of the chucking sleeve.

The chucking sleeve is shiftable lengthwise of the spindle by means of a shifting fork 66. Accordingly, when the chucking sleeve is moved to the right as seen in the drawing, the portion 62 of smaller diameter is brought to bear on the balls 56 and forces them inwardly between the inclined surface 54 of the chucking member 44 and the rearwardly facing surface of the pressure ring 28. The chucking member is thus moved to the left so that its outer end 46 pushes against the collet tube adjusting plate 48 to move the collet tube and collet forcibly to the left. The fingers of the collet are then forced inward as the outer inclined surface 40 of the collet move to the left and with respect to the complementary camming surface of the spindle. In this way, the work piece extending through the collet is gripped and held in place.

When the chucking sleeve is moved to the left as seen in the drawing, the portion 60 of larger diameter is presented to the balls 56 so that they can then ride upward and outward over the surface 54 of the chucking member 44. The collet tube is then released to move to the right under the expanding action of the fingers of the collet and the work piece is released to move forward through the tube and collet.

With this construction, the direction in which the sloping surface 64 on the chucking sleeve urges the balls 56 in actuating the collet is opposite to the direction in which the balls move the chucking member 44. The forces applied to the balls are thus opposed and distributed reducing the wear thereon. Moreover, the balls tend to rotate as they move in and out between the inclined surface 50 of the chucking member and the opposed surface of the pressure ring 28. Therefore, the wear on the balls is not localized and they seldom require replacement.

When it is desired to replace either or both of the bearings 6 and 8, it is only necessary to remove the spindle nose cap 12, loosen nut 18 and unscrew the nut 25 associated with the rear bearing 8. The driving gear 4 is then loosened and the shifting fork 66 removed whereupon the spindle and chucking assembly can be moved from the turret and frame by movement to the left without disturbing the tool setting in any way. The bearings can thus be replaced and the spindle assembly reinstalled with a minimum of time and expense.

While the construction provided is of general application, it is particularly useful as a replacement assembly for existing multiple spindle screw machines such as the Davenport machine. The substitution of such an assembly has been found in practice to permit operation at nearly twice the present speed of such machines whereas the time lost in making repairs and replacement of parts is greatly reduced.

While a preferred form of the present invention has been shown in the drawing, it will be apparent that numerous changes can be made in the form and arrangement of the elements employed. In view thereof, it should be understood that the construction shown and described is intended to be illustrative only and it is not intended to limit the scope of the invention.

I claim:

1. A spindle and spindle mounting for rotatably mounting a work holder in spaced front and rear turret members of an automatic screw machine including a spindle, a front bearing assembly between said spindle and said front turret member, and a rear bearing assembly between said rear turret member and said spindle, a front bearing assembly securing nut retaining said front bearing assembly in place with respect to the front turret member, a rear bearing assembly securing nut retaining said rear bearing assembly in place with respect to said rear turret member, said spindle being of forwardly diminishing cross section forward of said rear turret member, and a removable spindle nose cap forward of said front turret member, whereby said spindle and rear bearing assembly may be removed rearwardly from said turret members and said front bearing assembly upon removal of said nose cap.

2. A collet type bar stock work spindle for automatic screw machines having spaced front and rear turret members including a tubular spindle of forwardly diminishing diameters forwardly of said rear turret member, a collet tube movable longitudinally in said tube, a collet actuated by said tube to grip and release work in response to movement of said tube, a front roller bearing on said spindle to take radial thrust of said spindle, front and rear adjusting nuts on said front bearing engaging the front and rear faces of said front turret member respectively for retaining said front bearing between said spindle and said front turret member, a rear ball bearing assembly for said spindle to reduce vibration of said spindle, means for mounting said ball bearing assembly rearwardly of said rear turret member, said means including a bearing retainer extending forwardly through said rear turret member, a nut on said retainer holding said ball bearing assembly in place with respect to said rear turret member, and a removable spindle nose cap on said spindle forwardly of said front turret member.

3. The combination in an automatic screw machine of spaced front and rear turret members and a collet type bar stock work spindle including a tubular spindle of forwardly diminishing diameters forward of said rear turret member, a collet tube movable longitudinally in said tube, a collet actuated by said tube to grip and release work in response to movement of said tube, a front roller bearing on said spindle to take radial thrust of said spindle, front and rear adjusting nuts on said front bearing engaging the front and rear faces of said front turret member respectively for retaining said front bearing between said spindle and said front turret member, a rear ball bearing assembly for said spindle to reduce vibration of said spindle, means for mounting said ball bearing assembly rearwardly of said rear turret member, said means including a bearing retainer extending forwardly through said rear turret member, a nut on said retainer securing the ball bearing assembly in place with respect to said rear turret member, and a removable spindle nose cap on said spindle forwardly of said front turret member, together with means on said spindle forming a radially tapered ball channel, a complement of balls in said channel, a chucking device engageable with said complement of balls to urge said balls inwardly of said channel upon forward movement of said chucking device, and a chucking member engaging said collet tube movable rearwardly by said complement of balls upon forward movement of said chucking device.

References Cited in the file of this patent

UNITED STATES PATENTS

| | | |
|---|---|---|
| 1,443,127 | Hansen | Jan. 23, 1923 |
| 2,252,840 | Drissner | Aug. 19, 1941 |
| 2,310,259 | Ruppel | Feb. 9, 1943 |
| 2,375,734 | Montgomery | May 8, 1945 |